United States Patent
Yamaura et al.

(10) Patent No.: US 9,866,639 B2
(45) Date of Patent: Jan. 9, 2018

(54) COMMUNICATION APPARATUS, INFORMATION PROCESSOR, COMMUNICATION METHOD, AND COMPUTER-READABLE STORAGE MEDIUM

(71) Applicant: KABUSHIKI KAISHA TOSHIBA, Minato-ku, Tokyo (JP)

(72) Inventors: Takahiro Yamaura, Kawasaki Kanagawa (JP); Yuta Kobayashi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 14/614,871

(22) Filed: Feb. 5, 2015

(65) Prior Publication Data
US 2015/0264142 A1    Sep. 17, 2015

(30) Foreign Application Priority Data
Mar. 13, 2014   (JP) .................. 2014-050719

(51) Int. Cl.
*H04L 29/08*   (2006.01)
*H04L 29/06*   (2006.01)

(52) U.S. Cl.
CPC ........ *H04L 67/142* (2013.01); *H04L 67/1097* (2013.01); *H04L 67/14* (2013.01); *H04L 69/16* (2013.01); *H04L 69/321* (2013.01)

(58) Field of Classification Search
CPC .... H04L 67/142; H04L 67/1097; H04L 67/14
(Continued)

(56) References Cited

U.S. PATENT DOCUMENTS 6,693,879 B1 * 2/2004 Kawamura ........ H04B 10/1149
                                                          370/235
6,754,218 B1 * 6/2004 Murakami ............ H04B 7/022
                                                          370/395.1
(Continued)

FOREIGN PATENT DOCUMENTS

JP    2001-016227    1/2001
JP    2006-109016    4/2006
(Continued)

OTHER PUBLICATIONS

"Demystifying Storage Networking DAS, SAN, NAS Gateways, Fibre Channel, and iSCSI"—David Sacks, IBM, Jun. 2001 https://www-07.ibm.com/storage/au/pdf/demystifying_storage_networking.pdf.*

(Continued)

Primary Examiner — Randy Scott
(74) Attorney, Agent, or Firm — Nixon & Vanderhye, P.C.

(57) ABSTRACT

According to one embodiment, a communication apparatus communicates with a partner apparatus through a network. The communication apparatus comprises a protocol analyzing unit that analyzes a transmission frame or a reception frame, the transmission frame being generated by an external CPU and being transmitted to the partner apparatus, the reception frame being received from the partner apparatus. The communication apparatus comprises a connection information managing unit that allocates a storage area in which connection information is stored, in a predetermined storing apparatus that can be accessed by the CPU, when a connection establishment request is detected from the transmission frame or the reception frame as a result of the analysis by the protocol analyzing unit, the connection information being used while being shared with the CPU. The protocol ana- (Continued)

lyzing unit notifies the CPU of information indicating the storage area allocated by the connection information managing unit.

8 Claims, 9 Drawing Sheets

(58) Field of Classification Search
USPC ........ 709/216, 223, 224, 225, 227; 370/230, 370/235, 389
See application file for complete search history.

(56) References Cited

U.S. PATENT DOCUMENTS

| | | | |
|---|---|---|---|
| 7,724,771 | B2 | 5/2010 | Imao |
| 8,126,012 | B2 * | 2/2012 | Mishima ............ H04N 21/4305 370/394 |
| 8,248,960 | B2 | 8/2012 | Fukae et al. |
| 8,341,453 | B2 | 12/2012 | Shiraishi et al. |
| 8,725,879 | B2 | 5/2014 | Ajima et al. |
| 8,788,726 | B2 | 7/2014 | Tanaka et al. |
| 9,544,370 | B2 | 1/2017 | Tanaka et al. |
| 2002/0156927 | A1 | 10/2002 | Boucher et al. |
| 2006/0221946 | A1 | 10/2006 | Shalev et al. |
| 2008/0279304 | A1 * | 11/2008 | Fukae .................. H04L 5/1438 375/295 |
| 2012/0218914 | A1 | 8/2012 | Tanaka et al. |
| 2012/0233344 | A1 | 9/2012 | Yamaura et al. |
| 2014/0025771 | A1 | 1/2014 | Tanaka et al. |
| 2014/0198792 | A1 * | 7/2014 | Ueno ...................... H04L 45/34 370/392 |
| 2015/0264141 | A1 | 9/2015 | Yamaura et al. |

FOREIGN PATENT DOCUMENTS

| | | |
|---|---|---|
| JP | 2008-61223 | 3/2008 |
| JP | 2008-079150 | 4/2008 |
| JP | 2008-301472 | 12/2008 |
| JP | 2009-080584 | 4/2009 |
| JP | 2010-183450 | 8/2010 |
| JP | 2012-098838 | 5/2012 |
| JP | 2012-182551 | 9/2012 |
| JP | 2012-242961 | 12/2012 |
| JP | 2013-062683 | 4/2013 |
| JP | 2015-177261 | 10/2015 |
| WO | 2006119773 | 11/2006 |
| WO | 2010/087421 | 5/2010 |
| WO | WO 2011-033562 | 3/2011 |

OTHER PUBLICATIONS

Extended Search Report dated Aug. 19, 2015 in counterpart European Patent Application No. 15153936.8.
Engish-language machine-translation of JP2006-109016.
Engish-language machine-translation of WO2010/087421.

* cited by examiner

COMMUNICATION APPARATUS, INFORMATION PROCESSOR, COMMUNICATION METHOD, AND COMPUTER-READABLE STORAGE MEDIUM

CROSS-REFERENCE TO RELATED APPLICATIONS

This application is based upon and claims the benefit of priority from Japanese Patent Application No. 2014-050719, filed Mar. 13, 2014; the entire contents of which are incorporated herein by reference.

FIELD

Embodiments described herein relate generally to a communication apparatus, an information processor, a communication method, and a computer-readable storage medium.

BACKGROUND

In recent years, TCP/IP (Transmission Control Protocol/Internet Protocol) has been widely used as a protocol for performing communication among multiple hosts. The process for TCP/IP is performed at the time of reception and at the time of transmission, in accordance with the specification of the protocol, and it is general that this process is generally performed by the software that operates on a CPU.

In communication, the information containing an IP address, a port number, a sequence number, a window size and the like is stored in a memory, for storing the connection information in TCP. There is a limit to the area in the memory for storing the connection information, and therefore, it is necessary to reuse an area for the connection information that has been used once. On this occasion, in the connection establishment, it is necessary to allocate a memory area for storing the connection information from an unused memory area, and to initialize the connection information. In conventional communication apparatuses, these processes are performed by the CPU (Central Processing Unit).

DETAILED DESCRIPTION

According to one embodiment, a communication apparatus communicates with a partner apparatus through a network. The communication apparatus comprises a protocol analyzing unit that analyzes a transmission frame or a reception frame, the transmission frame being generated by an external CPU and being transmitted to the partner apparatus, the reception frame being received from the partner apparatus. The communication apparatus comprises a connection information managing unit that allocates a storage area in which connection information is stored, in a predetermined storing apparatus that can be accessed by the CPU, when a connection establishment request is detected from the transmission frame or the reception frame as a result of the analysis by the protocol analyzing unit, the connection information being used while being shared with the CPU. The protocol analyzing unit notifies the CPU of information indicating the storage area allocated by the connection information managing unit.

Hereinafter, an embodiment of the present invention will be explained.

In the explanation of the embodiment, a PDU (Protocol Data Unit), which is a unit of data transmission through a network, is referred to as a frame in a data link layer, is referred to as a packet in a network layer, and is referred to as a segment or a datagram in a transport layer. Further, a segment in which a bit for a SYN flag in TCP is set to 1 is referred to as a SYN segment, a segment in which the SYN flag and an ACK flag are set to 1 is referred to as a SNY/ACK segment, a segment in which the ACK flag is set to 1 is referred to as an ACK segment, a segment in which a FIN flag is set to 1 is referred to as a FIN segment, an ACK segment responding to the FIN segment is referred to as a FIN/ACK segment, and a segment in which an RST flag is set to 1 is referred to as an RST segment.

Figure 1:
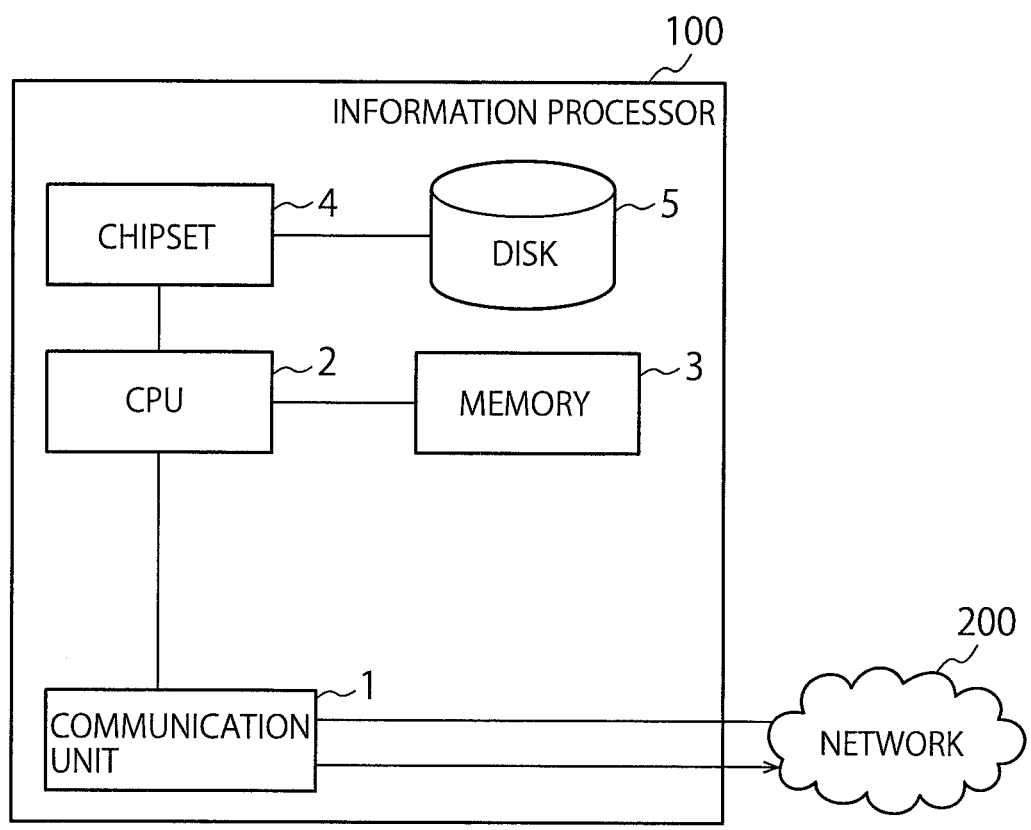
FIG. 1 is a schematic block diagram showing the configuration of an information processor 100 according to the embodiment.

An information processor 100 according to the embodiment establishes a connection before performing a data communication with another communication apparatus through a network 200. As an example, the information processor 100 according to the embodiment is a server. In the following, the information processor 100 according to the embodiment will be explained using FIG. 1. FIG. 1 is a schematic block diagram showing the configuration of an information processor 100 according to the embodiment. As shown in FIG. 1, the information processor 100 includes a communication unit 1, a CPU 2, a memory 3, a chipset 4 and a disk 5. As shown in FIG. 1, the constituent parts are connected by buses.

The communication unit 1 is connected with the CPU 2, and performs the transmission and reception of data with another communication apparatus (hereinafter, referred to as partner apparatus) through a network 200. In the embodiment, the communication unit 1, which is a PCI (Peripheral Component Interconnect) Express card as an example, is connected with the information processor 100 such that the insertion and removal are possible. Instead of the CPU 2, an offload engine implemented on the PCI Express card performs the protocol process for communication, and thereby, actualizes a quick communication by TCP/IP. The PCI Express card includes a connector for connecting with a PCI Express slot of the information processor 100, and includes a port for communicating with the network 200. Furthermore, the PCI Express card is equipped with a FPGA (Field Programmable Gate Array) and a memory, as an example.

Here, as shown in FIG. 1, the communication unit 1 is directly connected with the CPU 2, but without being limited to this, may be connected with the chipset 4. Concretely, the PCI Express bus may be directly connected with the CPU 2 as shown in FIG. 1, or may be connected through the chipset 4.

In the disk 5, to which the chipset 4 is connected, execution files of an operating system, various libraries and other applications are stored. As an example, the disk 5 is a hard disk.

The memory 3 is a memory that allows for the reading and writing by the CPU 2, and as an example, is a random access memory.

The CPU 2 is connected with the communication unit 1, the memory 3 and the chipset 4. The CPU 2 reads out the content of the disk 5 from the disk 5 through the chipset 4 to the memory 3, to execute the command, and thereby, has a function as a second protocol processing unit.

Figure 2:
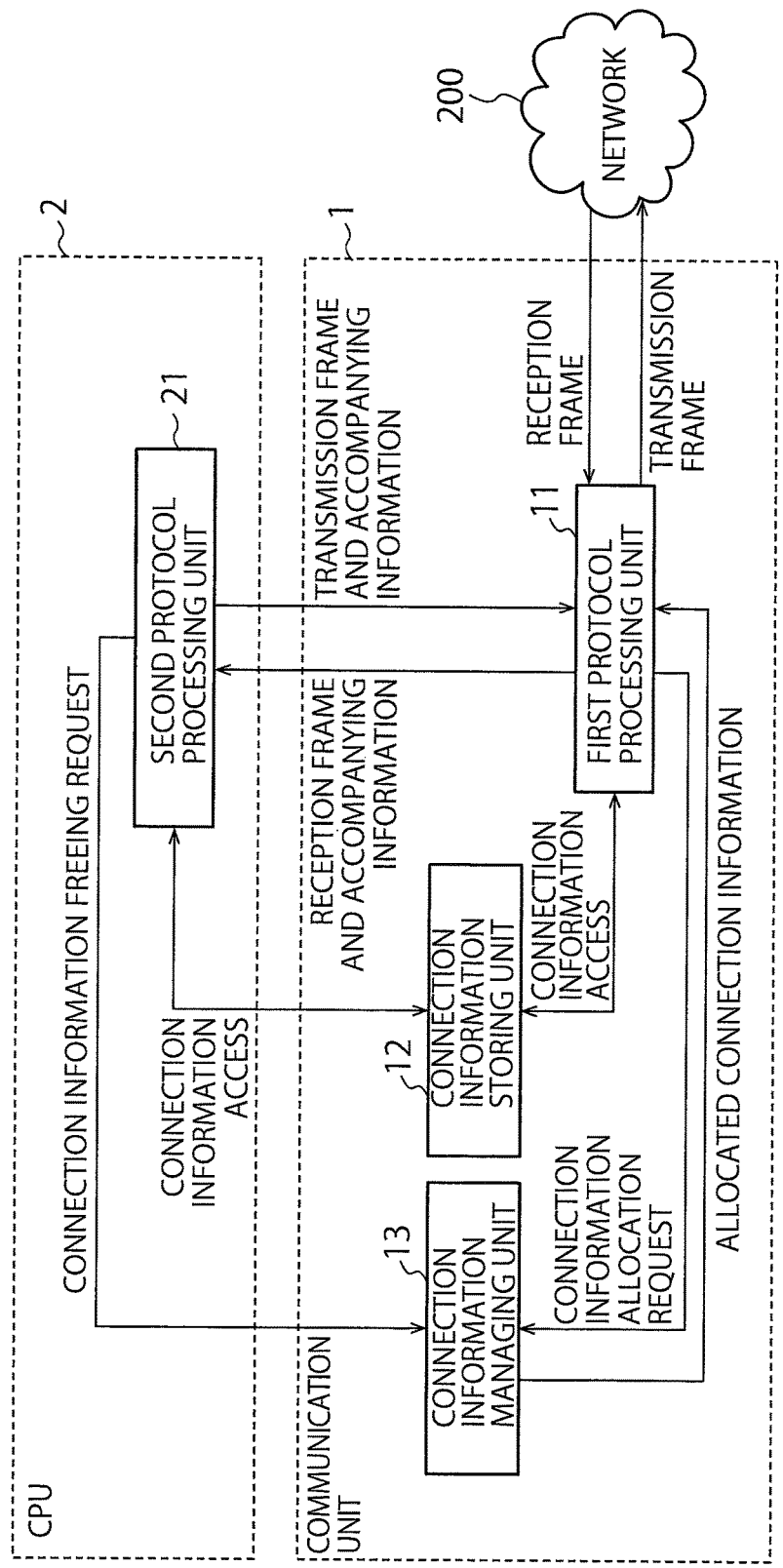
FIG. 2 is a schematic block diagram showing the functional configuration of the communication unit 1 and the CPU 2 in the embodiment.

Next, the configuration of the communication unit 1 and the CPU 2 will be explained using FIG. 2. FIG. 2 is a schematic block diagram showing the functional configuration of the communication unit 1 and the CPU 2 in the embodiment. As shown in FIG. 2, the communication unit 1 includes a first protocol processing unit (protocol analyzing unit) 11, a connection information storing unit 12 and a connection information managing unit 13. In the embodiment, as an example, the first protocol processing unit 11 and the connection information managing unit 13 are programmed so as to operate in the above-described FPGA. The connection information storing unit 12 is actualized by the memory on the PCI Express card. As functions not shown in the figure, necessary functions such as a controller in PCI Express for connecting with a server, an Ethernet® controller for connecting with the network 200, and a memory controller to control the memory are implemented in the FPGA.

As shown in FIG. 2, the first protocol processing unit 11 is connected with the network 200, and is connected with the connection information managing unit 13 and the connection information storing unit 12 by internal buses.

For example, the first protocol processing unit 11 sorts a received frame (hereinafter, referred to as a reception frame) into a control frame and a data frame, and then processes it. In the case of making the judgment of being the control frame, the first protocol processing unit 11 passes the frame to the second protocol processing unit 21 connected by the PCI Express bus. Then, the second protocol processing unit 21 processes the frame. On the other hand, in the case of making the judgment of being the data frame, the first protocol processing unit 11 stores the acquired data in a memory area that is designated by the connection information.

Further, the first protocol processing unit 11 analyzes a transmission frame that is generated by the external CPU and is transmitted to a partner apparatus, or a reception frame that is received from the partner apparatus. In more detail, when the transmission frame or the reception frame is on a predetermined protocol, the first protocol processing unit 11 analyzes the transmission frame or the reception frame. In the embodiment, as for the predetermined protocol, the data link layer involves Ethernet®, the network layer involves IPv4, and the transport layer involves TCP, as an example. Here, the data link layer may be a wireless LAN MAC layer in IEEE802.11.

Further, when a connection establishment request is detected from the transmission frame or the reception frame as the result of the analysis, the first protocol processing unit 11 requests the connection information managing unit 13 to allocate a storage area for storing the connection information that is used while being shared with the CPU 2. For example, when a frame in which only the SYN flag in TCP is set to 1 is received, the first protocol processing unit 11 requests the connection information managing unit 13 to allocate the storage area for storing the connection information. Thereafter, the first protocol processing unit 11 notifies the CPU 2 of the information indicating the storage area allocated by the connection information managing unit 13 in response to the request. Concretely, for example, the first protocol processing unit 11 notifies the CPU 2 of the storage area discrimination information by which the storage area determined by the connection information managing unit 13 is discriminated, as the information indicating the storage area allocated by the connection information managing unit 13.

On the other hand, when a request other than the connection establishment request is detected from the reception frame as the result of the analysis of the reception frame, the first protocol processing unit 11 outputs the reception frame to the second protocol processing unit 21, which performs the processes other than the connection establishment.

After the allocation of the storage area for storing the connection information, the first protocol processing unit 11 analyzes the transmission frame or the reception frame, and stores, as a part of the connection information, the header information contained in the transmission frame or the reception frame, in the storage area allocated by the connection information managing unit 13. This storing is referred to as the initialization. By the initialization, the values contained in the connection information, such as the IP address of the information processor 100 (hereinafter, referred to as its own apparatus also), the IP address of the partner apparatus, the TCP port number of its own apparatus, the TCP port number of the partner apparatus and the connection state, are stored. For example, when the reception frame is received, the first protocol processing unit 11 updates the connection information based on the header information contained in the reception frame.

Further, as a process on the transmission side, the first protocol processing unit 11 generates the Ethernet® header of a frame for which the instruction of the transmission is performed from the second protocol processing unit 21, and then transmits it. Further, the first protocol processing unit 11 reads out data from a memory area designated by the connection information, generates a segment in TCP, performs the header generation for IPv4 and Ethernet®, and then transmits it to the network 200.

Further, the first protocol processing unit 11 can access the connection information stored in the connection information storing unit 12. Further, the first protocol processing unit 11 can pass the reception frame and the accompanying information to the second protocol processing unit 21. Here, the accompanying information, which is the information associated with the frame, contains the address of the storage area allocated for storing the connection information and the information stored by the initialization of the connection information. Thereby, the information contained in the accompanying information by the initialization of the connection information can be added to the connection information.

When the frame is received, the first protocol processing unit 11 adds to the accompanying information, the storage area discrimination information (in the embodiment, the start address of the storage area, as an example) by which the storage area for storing the connection information is discriminated. Thereby, the second protocol processing unit 21 can access the storage area allocated by the first protocol processing unit 11, in response to the connection establishment request, and can read and write the connection information.

The connection information managing unit 13 manages multiple unused-state storage areas for storing the connection information. Concretely, the connection information managing unit 13 manages the storage area discrimination information by which each of the unused-state storage areas is discriminated. Here, in the embodiment, the storage area discrimination information is, as an example, the start address of the storage area in which the connection information is stored. Then, the connection information managing unit 13 determines the storage area for storing the connection information from the multiple unused-state storage areas.

Here, the connection information is the information relevant to the connection with the partner apparatus. Since multiple connections can be made with the partner apparatus, the connection information is the information for each connection. The connection information contains four pieces of information: the IP address of its own apparatus, the IP address of the partner apparatus, the TCP port number of its own apparatus and the TCP port number of the partner apparatus.

By these four pieces of information, the connection can be discriminated.

When the connection establishment request is detected from the transmission frame or the reception frame as the result of the analysis by the first protocol processing unit 11, the connection information managing unit 13 allocates the storage area for storing the connection information that is used while being shared with the CPU 2, in a predetermined storing apparatus that can be accessed by the CPU 2. Here, in the embodiment, the predetermined storing apparatus is, as an example, the connection information storing unit 12.

For example, the connection information managing unit 13 allocates the storage area for storing the connection information, in response to a request from the first protocol processing unit 11. Concretely, once the first protocol processing unit 11 requests the allocation of the storage area for storing the connection information, the connection information managing unit 13 acquires the start address of a storage area that is currently in an unused state, in response to the request, and then, informs it to the first protocol processing unit 11.

On the other hand, for example, once the second protocol processing unit 21 designates the start address of the connection information that is being currently used, as a connection freeing request, the connection information managing unit 13 manages it as the unused state. Thereby, the connection information managing unit 13 can utilize this start address of the storage area that is managed as the unused state, for an allocation request of the storage area for storing the subsequent connection information.

The connection information storing unit 12 stores the connection information that is shared between the first protocol processing unit 11 and the second protocol processing unit 21 when the protocol process is performed.

The CPU 2 reads out the content of the disk 5 to the memory 3, to execute the program, and thereby, functions as the second protocol processing unit 21. The second protocol processing unit 21 can access the connection information managing unit 13, the connection information storing unit 12, and the first protocol processing unit 11, through the PCI Express bus.

The second protocol processing unit 21 is configured by hardware different from the first protocol processing unit 11, and performs the protocol process of the transmission and reception frames. For example, the second protocol processing unit 21, for obtaining the MAC address of the data link layer, firstly passes a transmission frame with an ARP command to the first protocol processing unit 11, and instructs the first protocol processing unit 11 to transmit it to the partner apparatus. Here, the ARP command is a command for acquiring the MAC address corresponding to the IP address of the partner apparatus.

When the transmission frame is a frame for performing the connection establishment request, the second protocol processing unit 21 informs the first protocol processing unit 11 that the transmission frame is the connection establishment request. When being informed from the second protocol processing unit 21 that it is the connection establishment request, the first protocol processing unit 11 requests the connection information managing unit 13 to allocate the storage area for storing the connection information.

Further, when the transmission frame is a frame for performing the connection establishment request, the second protocol processing unit 21 generates the accompanying information that is associated with the transmission frame and is to be stored in the connection information. The first protocol processing unit 11 stores the information contained in the accompanying information generated by the second protocol processing unit 21 in the storage area allocated by the connection information managing unit 13.

Here, the accompanying information contains the information indicating the area of the writing destination of the reception data and the information indicating the area of the reading source of the transmission data. Here, the information indicating the area of the writing destination of the reception data is, for example, the address of the writing area of the reception data and the length of the writing area of the reception data. Further, the information indicating the area of the reading source of the transmission data is the address of the reading area of the transmission data and the length of the reading area of the transmission data. Thus, when the connection establishment request is detected from the transmission frame as the result of the analysis, the first protocol processing unit 11 stores, as a part of the connection information, the information indicating the area of the writing destination of the reception data and the information indicating the area of the reading source of the transmission data that are acquired from the CPU 2 together with the transmission frame, in the storage area allocated by the connection information managing unit 13.

Here, the accompanying information may indicate that the transmission frame is the connection establishment request.

The second protocol processing unit 21 judges whether or not to accept the connection establishment request detected from the reception frame. In the case of making the judgment of non-acceptance of the connection establishment request, the second protocol processing unit 21 requests the connection information managing unit 13 to free the storage area allocated for the connection establishment request. In response to this request, the connection information managing unit 13 frees the above storage area, according to the request from the CPU 2.

On the other hand, in the case of making the judgment of acceptance of the connection establishment request, the second protocol processing unit 21 generates a connection establishment response segment (SYN/ACK segment). Then, the second protocol processing unit 21 instructs the first protocol processing unit 11 to transmit a connection establishment response frame corresponding to the connection establishment response segment.

Further, the second protocol processing unit 21 can access the connection information stored in the connection information storing unit 12. Further, the second protocol processing unit 21 can pass the transmission frame and the accompanying information to the first protocol processing unit 11.

For example, when the frame is transmitted, the second protocol processing unit 21 allocates the writing area of the reception data and the writing area of the transmission data, and then sets the address and length of the allocated writing area of the reception data and the address and length of the allocated writing area of the transmission data, as the "accompanying information of the frame" of a transmission frame descriptor. Thereby, when the connection information is initialized, the first protocol processing unit 11 can write the information contained in the "accompanying information of the frame" to the corresponding point in the connection information.

Therefore, before the first protocol processing unit 11 receives a reply to the transmitted SYN segment, it is possible to write "the address and length of the writing area of the reception data and the address and length of the writing area of the transmission data" in the connection information. In this way, it is possible to avoid receiving the SYN/ACK segment from the partner apparatus before the writing. Therefore, no matter when the SYN/ACK segment is received from the partner apparatus, it is possible to find, in a hash table, the connection when the SYN segment was transmitted.

Here, in the embodiment, as an example, the second protocol processing unit 21 manages the connection information in the single protocol, that is, TCP, but without being limited to this, may manage the connection information in two or more protocols, such as TCP and SCTP.

Figure 3:
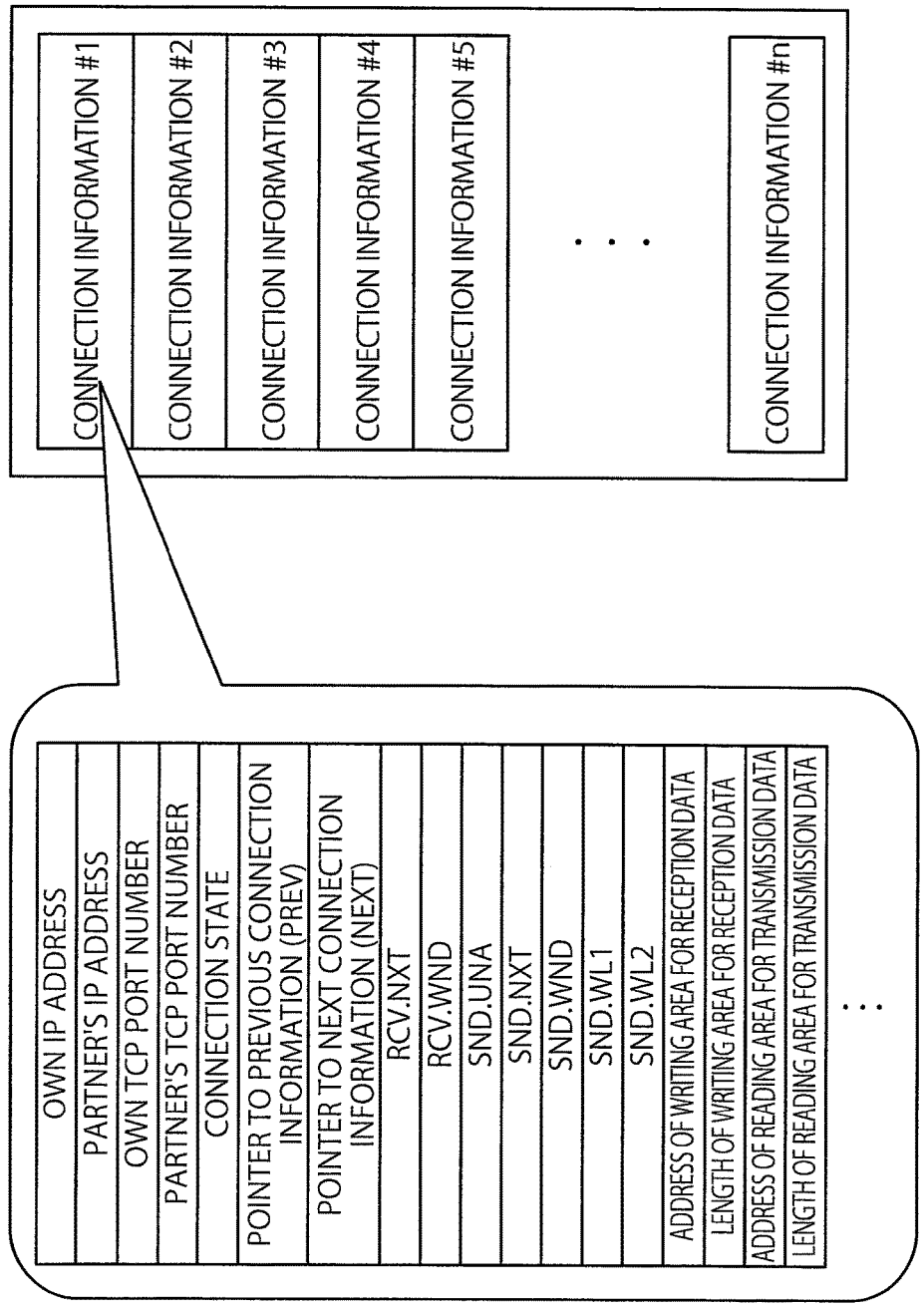
FIG. 3 is an example of the connection information to be stored in the connection information storing unit 12.

Next, the connection information stored in the connection information storing unit 12 will be explained using FIG. 3. FIG. 3 is an example of the connection information to be stored in the connection information storing unit 12. The connection information to be stored in the connection information storing unit 12 is each constituted by elements shown in FIG. 3. In addition to the IP address of its own apparatus, the IP address of the partner apparatus, the port number of its own apparatus, and the port number of the partner apparatus for determining the connection, each connection information has the connection state, a pointer to the previous connection information (PREV), a pointer to the next connection information (NEXT), "RCV.NXT" (a sequence number that is expected to be received next), "RCV.WND" (a reception widow size), "SND.UNA" (a sequence number for which an acknowledgement is not yet performed), "SND.NXT" (a sequence number that is used at the time of the next transmission), "SND.WND" (a transmission window size), "SND.WL1" (a sequence number of the last window update), "SND.WL2" (an acknowledgement number of the last window update), the address of a writing area for reception data, the length of the writing area for the reception data, the address of a reading area for transmission data, the length of the reading area for the transmission data, and the like.

Naturally, there is no need to be limited to this, and for example, other information defined in RFC793 may be contained, or optionally defined information such as a SACK (Selective ACKnowledgement), the partner's MAC (Media Access Control) address or TOS (Type Of Service) value, a TTL (Time To Live) value, or the like may be contained. Here, RFC793 is the transmission control protocol DARPA internet program protocol specification.

Figure 4:
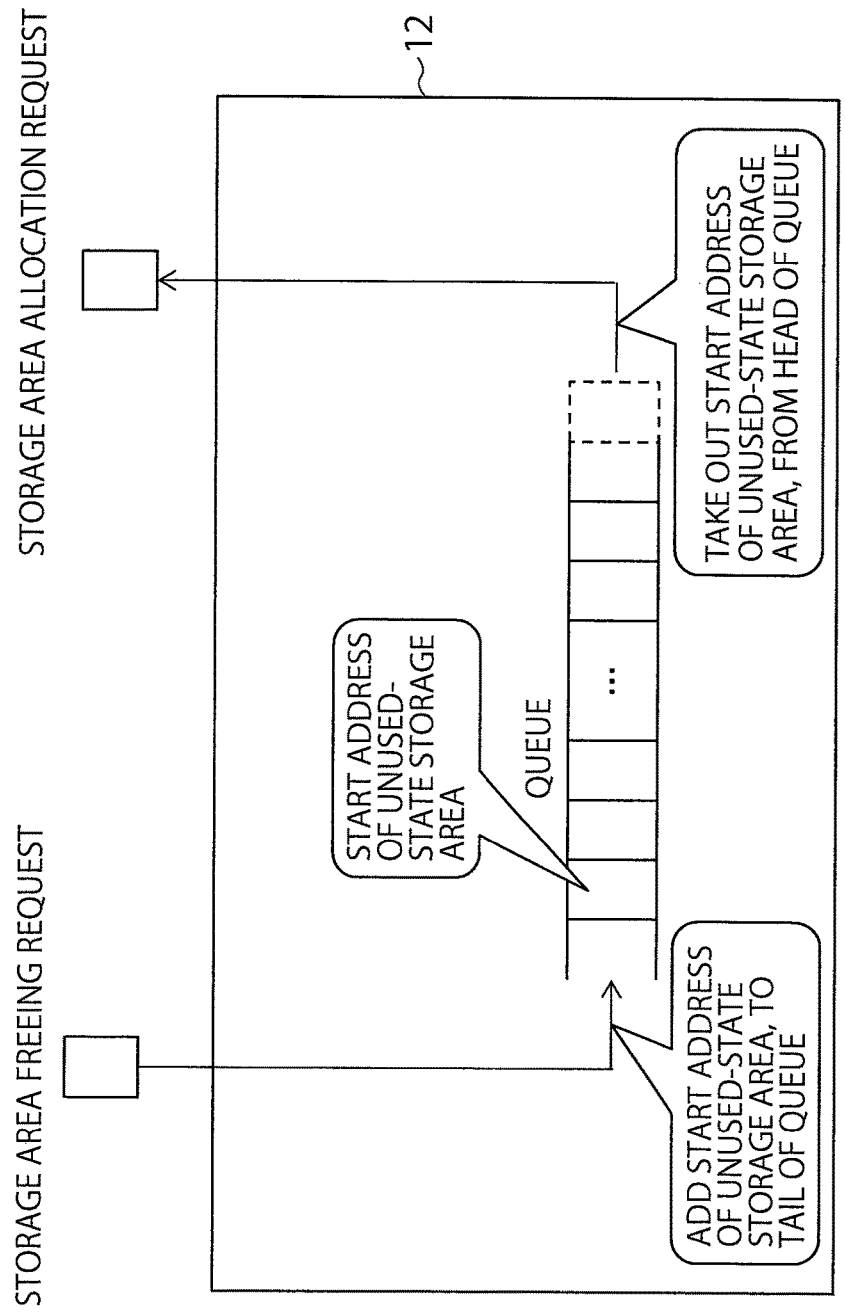
FIG. 4 is an example of a queue that is managed by the connection information managing unit 13 and in which the start address of the storage area discrimination information for discriminating an unused-state storage area is stored.

FIG. 4 is an example of a queue that is managed by the connection information managing unit 13 and in which the start address of the storage area discrimination information for discriminating an unused-state storage area is stored. As shown in FIG. 4, the connection information managing unit 13, as an example, manages the start address of the unused-state storage area, in the queue. Here, as an example, at the initial stage, the CPU 2 stores the start address of the storage area in the queue, for all the storage areas that are allocated in the connection information storing unit 12.

In the following, an example of the process by the connection information managing unit 13 will be explained. When the connection is broken as described later, the connection information managing unit 13 adds the start address of the storage area designated by the storage area freeing request from the second protocol processing unit 21, to the last of the queue, as an element of the queue. On the other hand, when the storage area allocation request is received from the first protocol processing unit 11, the connection information managing unit 13 takes out the start address of the storage area from the head of the queue, and informs the taken start address of the storage area to the first protocol processing unit 11.

Here, the second protocol processing unit 21 issues the freeing request for all the storage areas at the time of the apparatus activation, and thereby, the queue can start the operation in a state in which all the storage areas are unused.

The connection information managing unit 13 may perform this process by itself, at the time of the activation.

In the queue of FIG. 4, the ID of the unused-state storage area may be stored, instead of the start address of the unused-state storage area. Thus, the information stored in the queue only has to be the storage area discrimination information by which the storage area can be discriminated.

Figure 5:
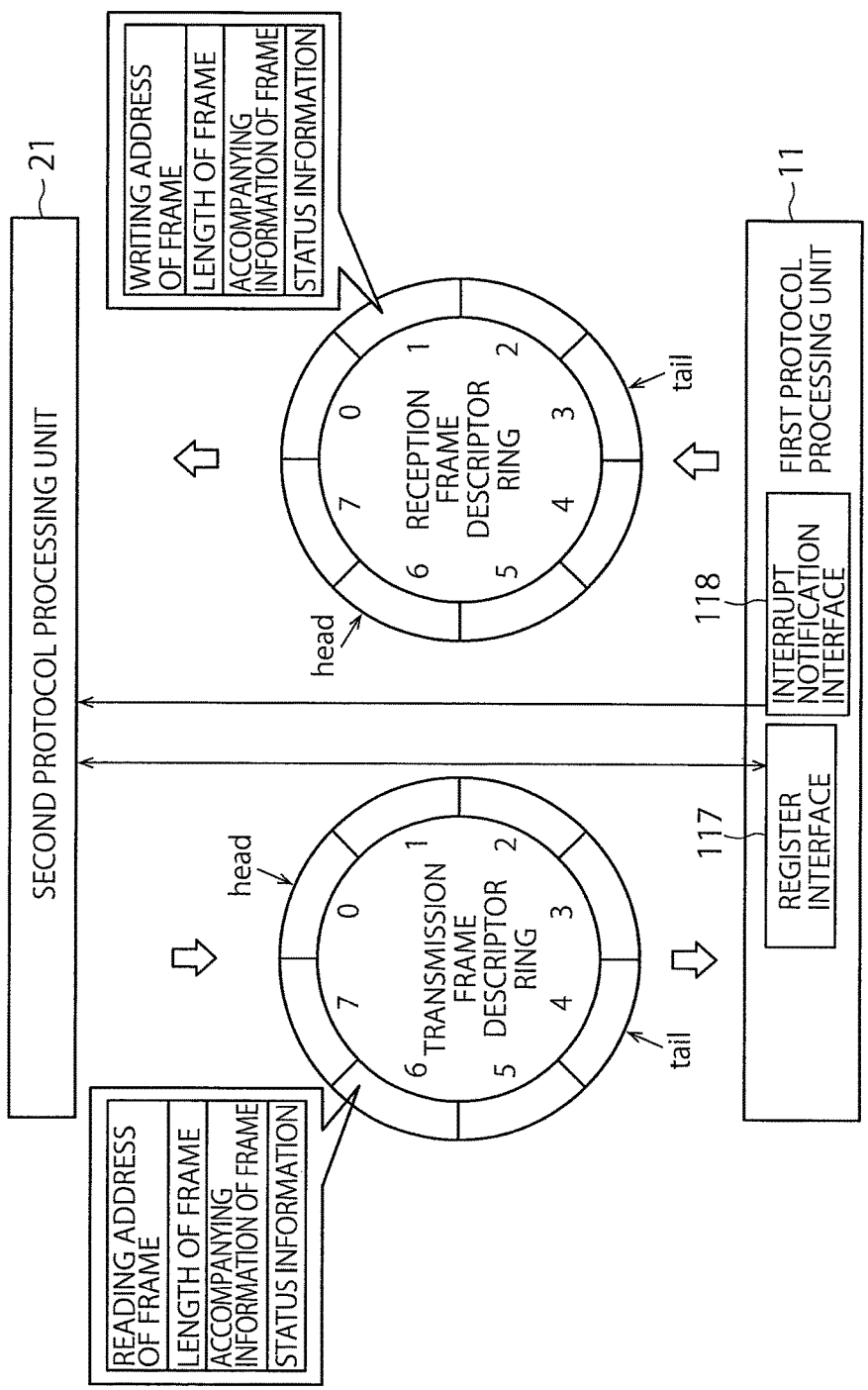
FIG. 5 is a diagram showing a method for transmitting and receiving a frame and the accompanying information of the frame between the first protocol processing unit 11 and the second protocol processing unit 21.

FIG. 5 is a diagram showing a method for transmitting and receiving a frame and the accompanying information of the frame between the first protocol processing unit 11 and the second protocol processing unit 21. In the transfer of a frame and the accompanying information from the first protocol processing unit 11 to the second protocol processing unit 21, a reception frame descriptor ring, which is configured by a ring buffer, is used. In the transfer of a frame from the second protocol processing unit 21 to the first protocol processing unit 11, a transmission frame descriptor ring, which is similarly configured by a ring buffer, is used. Hereinafter, the reception frame descriptor ring and the transmission frame descriptor ring are collectively referred to as the descriptor ring.

Both descriptor rings are stored in the memory 3. As both descriptor rings, rings each of which has eight elements (descriptors) are illustrated here. In practice, there are as many descriptors as necessary for absorbing the processing speed difference between the first protocol processing unit 11 and the second protocol processing unit 21. The respective descriptor rings are controlled, using values "head" and "tail", respectively.

(About a Method for Transferring a Received Frame and the Accompanying Information)

First, a method for transferring a received frame and the accompanying information from the first protocol processing unit 11 to the second protocol processing unit 21 will be explained. Each element in the reception frame descriptor ring is configured by the writing destination address of a frame, the length of the frame, the accompanying information of the frame, and the status information. The status information contains a bit showing the information on an error that occurs in the first protocol processing unit 11, and a DONE bit showing that the first protocol processing unit 11 has completed the writing to a descriptor. The first protocol processing unit 11 manages the writing to the reception frame descriptor ring, using the two variables "head" and "tail". For example, the first protocol processing unit 11 decides that the writing is possible for the reception frame descriptor ring of "head" to "tail-1".

Here, the maximum of the number of descriptors to which the first protocol processing unit 11 can perform the writing is the maximum descriptor number—1, and in this example, is 7. The situation in which "head" and "tail" coincide shows that there is no reception frame descriptor ring to which the first protocol processing unit 11 can perform the writing. The values of "head" and "tail" are managed by each of the first protocol processing unit 11 and the second protocol processing unit 21. The first protocol processing unit 11 further includes a register interface 117 for mutually performing the notification of the values of "head" and "tail", or for mutually performing the notification of the start address of the reception frame descriptor ring and the length of a descriptor. Also, the first protocol processing unit 11 further includes an interrupt notification interface 118 for showing that the second protocol processing unit 21 has a descriptor to be processed.

As an initialization process, the second protocol processing unit 21 allocates an area necessary for configuring the reception frame descriptor ring in the memory 3, and sets the start address of the reception frame descriptor ring and the length of a descriptor, in the first protocol processing unit 11, through the above-described register interface 117.

Next, as an initialization process for the descriptors contained in the reception frame descriptor ring, the second protocol processing unit 21 allocates areas enough to store received frames in the memory respectively, and sets the addresses as the writing destination addresses of frames.

On this occasion, the second protocol processing unit 21 clears the lengths of frames, the accompanying information of frames and the status information to 0.

After the initialization process finishes for all the descriptors contained in the reception frame descriptor ring, the second protocol processing unit 21 clears its own managing "head" to 0, and sets the "tail" to 7. Then, the second protocol processing unit 21 instructs the first protocol processing unit to set the same values as the values of "head" and "tail" that are managed by the first protocol processing unit 11.

In the wake of this, the first protocol processing unit 11 starts the operation, and reads the information (hereinafter, referred to as descriptor information) contained in the descriptor at the "head" position in the case of judging that a received frame is passed to the second protocol processing unit 21 as the control frame. Then, the first protocol processing unit 11 acquires the writing destination address of the frame contained in the read descriptor information. The first protocol processing unit 11 writes the control frame to the storage area in the memory 3 shown by the acquired writing destination address, and sets the length of the written control frame, as the "length of the frame" contained in the descriptor.

On this occasion, if there is connection information associated with the control frame, the first protocol processing unit 11 stores the start address of the connection information, in an area for the connection information contained in the accompanying information of the frame. If there is no particularly associated connection information, the first protocol processing unit 11 stores a special value such as 0.

When the writing of the control frame and the writing for the other parts of the descriptor contained in the reception frame descriptor ring are completed, the first protocol processing unit 11 stores 1 to the DONE bit of the status information, and the first protocol processing unit 11 performs an interrupt notification to the second protocol processing unit 21 through the interrupt notification interface 118. Thereafter, the first protocol processing unit 11 increments, by 1, the value of "head" that is managed by the first protocol processing unit 11, and performs the process of the next control frame, at the position of the new "head", as long as "head" does not catch the position of "tail-1".

Once receiving the interrupt notification from the first protocol processing unit 11 through the interrupt notification interface 118, the second protocol processing unit 21 reads the DONE bit of the status information of the descriptor that is indicated by its own managing "tail". At this time, if the DONE bit is set to 0, the second protocol processing unit 21 does not perform any process.

On the other hand, if the DONE bit is set to 1, this shows that the first protocol processing unit 11 has completed the process for the descriptor. Therefore, the second protocol processing unit 21 acquires, as the reception frame, an area in the memory 3 that is indicated by the writing destination address of the frame and that has a length indicated by the length of the frame. Further, as necessary, the second protocol processing unit 21 processes the frame, using the connection information contained in the accompanying information of the frame. As for the detail of the process of the frame here, an operation example will be shown and explained later.

When the process of the frame is completed, the second protocol processing unit 21 sets the DONE bit of the status bits to 0, increments the value of its own managing "tail" by 1, and reflects the value of "tail" in that of the first protocol processing unit 11. Thereby, the first protocol processing unit 11 can newly perform the storing to the descriptor for which the process is completed. The second protocol processing unit 21 repeats this operation, whenever an interrupt occurs. Here, as the writing destination address of a frame, a memory area allocated newly each time may be set.

(About a Method for Transferring a Frame Intended to be Transmitted)

Next, a method for transferring a frame intended to be transmitted from the second protocol processing unit 21 to the first protocol processing unit 11 will be explained. Each descriptor contained in the transmission frame descriptor ring is configured by a reading source address of a frame, the length of the frame, the accompanying information of the frame, and the status information. Similarly to the reception frame descriptor ring, the status information contains a bit showing the information on an error, and a DONE bit. The use method of "head" and "tail" is also the same as the reception side, and therefore, the explanation is omitted here.

Here, although the number of the interrupt notification interface 118 is one in FIG. 3, the interface may be appropriately provided separately for the transmission side and the reception side.

As an initialization process, the second protocol processing unit 21 allocates an area necessary for configuring the descriptor ring, in the memory 3 of the information processor 100, and sets the start address of the descriptor ring and the length of a descriptor, in the first protocol processing unit 11, through the above-described register interface 117. Next, the second protocol processing unit 21 sets the values of its own managing "head" and "tail" to 0, and sets also the values of "head" and "tail" of the first protocol processing unit 11, to 0.

When a frame is attempted to be transmitted, the second protocol processing unit 21 sets the address and length of the frame that is attempted to be transmitted, as the reading source address of a frame and the length of the frame for the descriptor at the position of its own managing "tail", respectively. Further, on this occasion, for example, if a value is intended to be stored in the connection information as the information accompanying the frame, the second protocol processing unit 21 stores it in the accompanying information of the frame. Then, the second protocol processing unit 21 clears all the status information to 0, and thereafter, increments the value of "tail" by 1, to perform the notification of the value of "tail" to the first protocol processing unit 11.

Once receiving this, the first protocol processing unit 11 acquires the reading source address of the frame, the length of the frame and the accompanying information of the frame, from the descriptor that is indicated by "head", performs the process in accordance with the accompanying information of the frame, and thereafter, transmits the frame to the network 200. Then, the first protocol processing unit 11 rewrites the DONE bit of the status information of the descriptor to 1, increments the value of its own managing "head" by 1, and thereafter, performs the interrupt notification through the interrupt notification interface 118.

Once receiving the interrupt notification, the second protocol processing unit 21 checks the DONE bit of the descriptor at the position of its own managing "head", and, if this is set to 0, does not perform any process. If this is set to 1, the first protocol processing unit 11 has completed the process, and therefore, the second protocol processing unit 21 performs the process of freeing the memory for the frame that has been transmitted, and increments the value of its own managing "head" by 1.

The establishment of the connection in TCP is classified into an active open in which the connection establishment is performed from its own apparatus, a passive open in which the connection establishment is performed from the partner apparatus, and a simultaneous open in which both hosts simultaneously perform the connection establishment.

Figure 6:
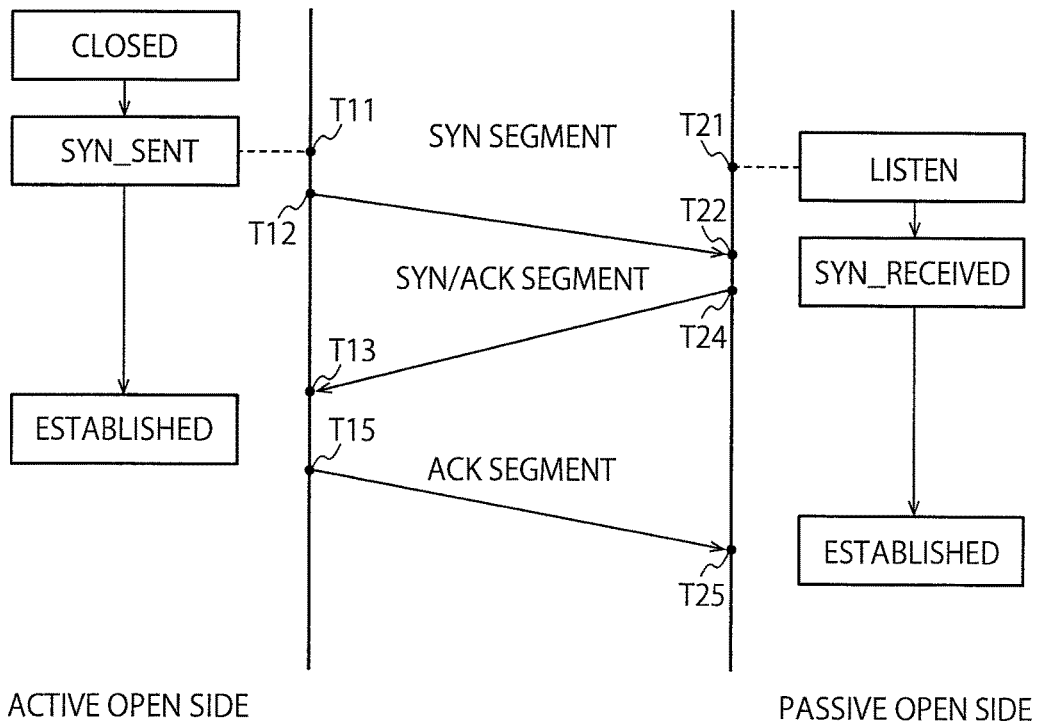
FIG. 6 is a sequence diagram showing the flow of the processes of a passive open and an active open.

The passive open and the active open will be explained using FIG. 6. FIG. 6 is a sequence diagram showing the flow of the processes of a passive open and an active open. Here, in FIG. 6, the sequence number, the acknowledgement number and the like contained in each TCP segment are omitted. It is assumed that the SYN flag is counted as 1 byte and the acknowledgement number is transmitted, similarly to the regulation of RFC793.

(The Flow of the Process of the Passive Open)

First, the passive open will be explained.

(T21) Its own apparatus, first, creates the connection information in which the connection state is "LISTEN", for waiting for the connection establishment request from a partner apparatus.

(T11) The partner apparatus creates the connection information for performing the communication, and transits the connection state to "SYN_SENT".

(T12) Then, the partner apparatus transmits the SYN segment.

(T22) Its own apparatus receives this SYN segment, and newly creates the connection information in which the connection state is "SYN_RECEIVED".

(T24) Then, its own apparatus transmits the created SYN/ACK segment to the partner apparatus.

(T13) The partner apparatus receives this segment, and shifts the connection state to "ESTABLISHED".

(T15) The partner apparatus transmits the ACK segment toward its own apparatus.

(T25) Its own apparatus receives this ACK segment, and transits the connection state to "ESTABLISHED" so that the connection between both is established.

(The Outline of the Process of the Active Open)

Next, in the active open, the operation is the same as the previously-described partner apparatus. A partner apparatus creates the connection information in which the connection state is "LISTEN", and waits for the connection establishment request. At this time, its own apparatus creates the connection. Then, its own apparatus transits the connection state to "SYN_SENT", and transmits the SYN segment. Then, its own apparatus receives the SYN/ACK, transits the connection state to the "ESTABLISHED", and transmits the ACK segment, so that the connection between both is established.

(The Flow of the Process of the Simultaneous Open)

Figure 7:
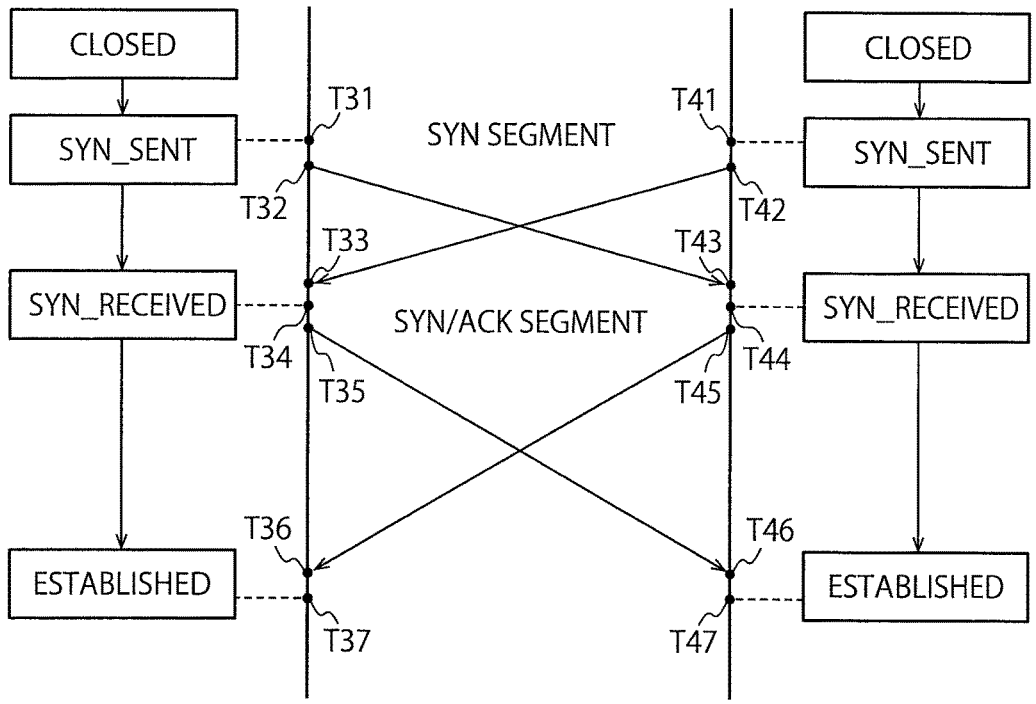
FIG. 7 is a sequence diagram showing the flow of the process of a simultaneous open according to the embodiment.

Next, the simultaneous open will be explained using FIG. 7. FIG. 7 is a sequence diagram showing the flow of the process of a simultaneous open according to the embodiment. The simultaneous open occurs when its own apparatus and the partner apparatus simultaneously transmit the connection establishment request.

(T31, T41) First, its own apparatus creates the connection, and transits the connection state to "SYN_SENT".

(T32, T42) Then, its own apparatus transmits a SYN segment.

(T33, T43) After the transmission of the SYN segment, its own apparatus receives a SYN segment from the partner apparatus also (T34, T44) Once the SYN segment is received from the partner apparatus, the connection state is transited from "SYN_SENT" to "SYN_RECEIVED" (T34, T44).

(T35, T45) Then, its own apparatus transmits a SYN/ACK segment to the partner apparatus.

(T36, T46) The partner also transmits a SYN/ACK segment similarly, and therefore, its own apparatus receives this.

(T37, T47) Once receiving the SYN/ACK segment, its own apparatus transits the connection state to "ESTABLISHED", so that the connection is established.

Figure 8:
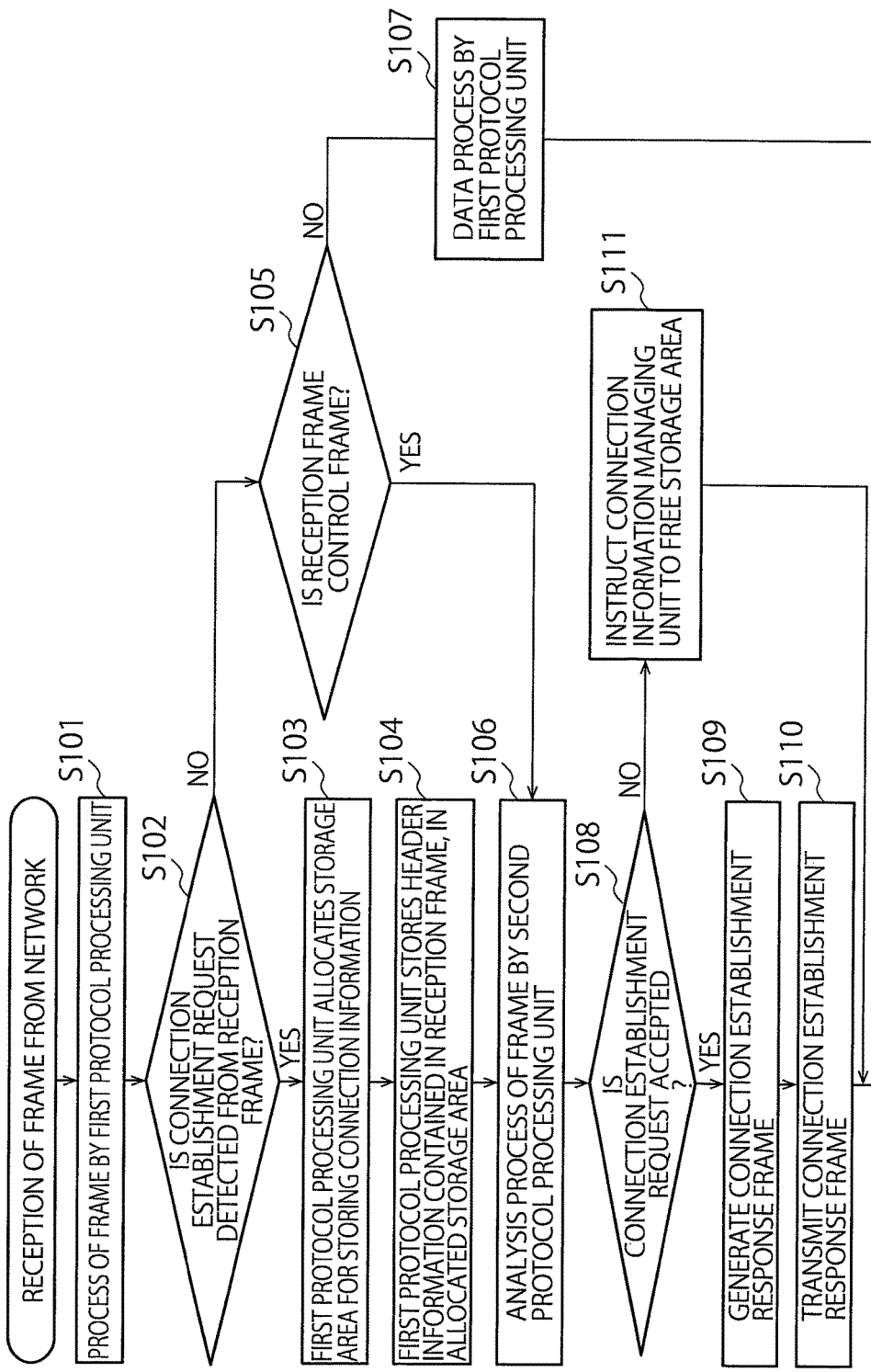
FIG. 8 is a flowchart showing an example of the flow of the passive open in the connection establishment according to the embodiment.

Next, the flow of the process of the passive open in the connection establishment according to the embodiment will be explained using FIG. 8. FIG. 8 is a flowchart showing an example of the flow of the passive open in the connection establishment according to the embodiment.

(Step S101) First, the second protocol processing unit 21 creates the connection in which the connection state is "LISTEN", in order to wait for the connection establishment request. This connection does not necessarily have to be saved in the connection information storing unit 12, and may be saved in the memory 3.

The partner apparatus transmits the SYN segment, which is the connection establishment request. The SYN segment reaches the first protocol processing unit 11 through the network, and the first protocol processing unit 11 performs the process for the protocol of each layer. The first protocol processing unit 11 has a processing function for the data part in Ethernet®, IPv4 and TCP, for example, and passes a frame for which the first protocol processing unit 11 cannot complete the process, for example, an ARP or ICMP packet, or a segment in which the flags other than the ACK flag or PSH flag in TCP are set to 1, to the second protocol processing unit 21, as the control frame.

When the data link layer involves Ethernet®, the first protocol processing unit 11 performs, for example, the head detection of the frame, the verification of the FCS (Frame Check Sequence), the detection of whether the destination MAC address indicates its own apparatus, and the detection of the ID indicating the upper layer protocol from the type field. When the corruption of the frame is detected as the result of the verification of the FCS, the frame is discarded by the first protocol processing unit 11.

Next, when the network layer protocol is IPv4, the first protocol processing unit 11 performs, for example, the verification of the header checksum, the check of the version field, the detection of the header length, the check of the packet length, and the detection and reassembling process of fragments. Further, the first protocol processing unit 11 performs, for example, the detection of the protocol number of the upper layer, the confirmation of whether the destination IP address indicates its own apparatus, and the ARP table registration using the source IP address and the source MAC address. Further, depending on the destination IP address, the first protocol processing unit 11 performs the routing operation, for example. If the corruption of the packet is detected as the result of the verification of the header checksum, the packet is discarded by the first protocol processing unit 11.

Further, if the protocol of the network layer is other than IPv4, the first protocol processing unit 11 passes the reception frame to the second protocol processing unit 21, as the control frame.

When the protocol of the transport layer, which is the upper layer, is TCP, the first protocol processing unit 11, for example, performs the verification of the checksum, and acquires the source port number, the destination port number, the sequence number, the acknowledgement number, the offset, the control flags, and the window size. In this case, also, if the corruption is detected as the result of the verification of the checksum, the segment is discarded by the first protocol processing unit 11.

(Step S102) If the corruption is not detected as the result of the verification of the checksum, the first protocol processing unit 11, first, analyzes the acquired control flags of the segment, and judges whether or not the connection establishment request is detected from the reception frame.

Here, it is allowable to perform the judgment, for example, based on the header information of each protocol such as the IP address or the port number in TCP, in addition to the above condition, and to make the judgment of being the connection establishment request, only for the connection with a particular host or the connection of a particular port number. Further, it is allowable to make the judgment of being the connection establishment request, in the wake of the reception of the ACK segment at the time of the connection establishment.

(Step S103) In the case where the connection establishment request is detected from the reception frame in step S102, the first protocol processing unit 11 requests the connection information managing unit 13 to allocate the storage area for storing the connection information that is used while being shared with the CPU 2. In response to this request, the connection information managing unit 13 allocates, in the connection information storing unit 12, the storage area for storing the connection information that is used while being shared with the CPU 2.

(Step S104) Next, the first protocol processing unit 11 stores, as a part of the connection information, the header information contained in the reception frame, in the storage area allocated by the connection information managing unit 13 in step S103. Here, the information that the first protocol processing unit 11 stores for the initialization is the IP address of its own apparatus, the IP address of the partner apparatus, the port number of its own apparatus, the port number of the partner apparatus, the connection state, the sequence number of the partner apparatus and the window size of the partner apparatus that are taken out from the reception frame. Naturally, the first protocol processing unit 11 may write the information such as a window scaling value and a time stamp, which are TCP options other than them. Further, the first protocol processing unit 11 writes the start address of the storage area for storing the connection information, in the "accompanying information of the frame" of the reception frame descriptor.

When this process is completed, the first protocol processing unit 11 transfers the information of the reception frame to the second protocol processing unit 21, using the above-described reception frame descriptor ring. On this occasion, the first protocol processing unit 11 stores the writing destination address of the reception frame, in the "writing destination address of the frame" of the descriptor contained in the reception frame descriptor ring. Thereafter, the first protocol processing unit 11 adds the start address of the storage area allocated in step S103, to the descriptor, as the accompanying information of the frame. Then, the first protocol processing unit 11 sets the DONE bit of the status information contained in the descriptor to 1, and performs an interrupt notification.

On this occasion, as the accompanying information of the frame, the first protocol processing unit 11 may add the information already extracted from the reception frame, such as the protocol type of the network layer and the protocol type of the transport layer. Thereby, the second protocol processing unit 21 can omit a part of the process.

(Step S105) In the case where the connection establishment request is not detected from the reception frame in step S102, the first protocol processing unit 11 judges whether or not the reception frame is the control frame.

For example, if any one of the FIN flag and RST flag of the acquired control flags is set to 1, the first protocol processing unit 11 judges that the reception frame is the control frame (YES). Then, the first protocol processing unit 11 passes the reception frame to the second protocol processing unit 21 as the control frame, and the second protocol processing unit 21 executes the process in step S106. On the other hand, in the case where the reception frame is not the control frame (NO), the process in the first protocol processing unit 11 proceeds to step S107.

For the other segments, the first protocol processing unit 11 performs the search of the connection information from the connection information storing unit 12. The search of the connection information is performed using the start IP address, the destination IP address, and the start port number and the destination port number in TCP, and the connection that matches in all of them is searched based on the previously acquired information. On that occasion, for the speed-up of the process, the first protocol processing unit 11 uses, for example, a hash table stored in the connection information storing unit 12 while adopting the IP address or the port number as a key, and thereby, the speed-up of the search is performed. The detail of the hash table will be described later.

(Step S106) In the case where the process in step S104 is completed, or in the case of judging that the reception frame is the control frame in step S105, the second protocol processing unit 21 performs the analysis process of the frame. Concretely, the second protocol processing unit 21, for example, acquires the information of the frame, and the start address of the storage area contained in the accompanying information of the frame. The second protocol processing unit 21 acquires the source IP address and the destination IP address of the frame, the source port number in TCP and the destination port number in TCP, from the connection information, and, using them, searches the connection information in which the connection state is "LISTEN", in the connection information storing unit 12.

(Step S107) In the case where the matching connection information is found, where the received TCP segment has data, and where they are acceptable as the result of the confirmation of the sequence number and the like, the first protocol processing unit 11 writes the data in a memory area designated by the address and length of the writing area of the reception data that are contained in the connection information. This memory area is an area in the memory 3. Then, for showing that the data have been received, the first protocol processing unit 11 transmits a TCP segment for the acknowledgement to the partner apparatus. In TCP, there are various regulations for the confirmation of the sequence number of a received TCP segment, but they are omitted here.

(Step S108) Next, the second protocol processing unit 21 judges whether or not to accept the connection establishment request, from the result of the analysis process in step S106. For example, if the matching connection information exists as the result of the search of the connection information in which the connection state is "LISTEN" in step S106, the second protocol processing unit 21 judges that the connection establishment is accepted. On the other hand, in the case of not matching, the second protocol processing unit 21 judges that the connection establishment is not accepted.

In the case where the connection establishment is accepted (YES), the second protocol processing unit 21 proceeds to step S109. In the case where the connection establishment is not accepted (NO), the second protocol processing unit 21 proceeds to step S111.

(Step S109) In the case of judging that the connection establishment request is accepted in step S108, the second protocol processing unit 21 connects with the hash table, and stores the address and length of the writing area of the reception frame, the address and length of the reading area of the transmission data and the like, in the storage area allocated in step S103. Then, the second protocol processing unit 21 generates the connection establishment response frame (SYN/ACK segment), and passes the generated connection establishment response frame to the first protocol processing unit 11.

(Step S110) The first protocol processing unit 11 transmits the connection establishment response frame generated in step S109 to the partner apparatus through the network 200. The first protocol processing unit 11 acquires the transmission sequence number, the window size of its own apparatus and the like, from the connection establishment response frame, and stores the acquired information in the storage area allocated in step S103. Here, the storing in the storage area allocated in step S103 may be performed by the second protocol processing unit 21.

(Step S111) In the case of judging that the connection establishment is not accepted in step S108, the second protocol processing unit 21 instructs the connection information managing unit 13 to free the storage area for storing the connection information that was allocated when the SYN segment was received. On that occasion, the second protocol processing unit 21 informs the connection information managing unit 13 of the start address of the storage area for storing the connection information.

Here, also in the case where the reception to the port is restricted by a packet filter or the like, the second protocol processing unit 21 may request the connection information managing unit 13 to free the storage area for storing the connection information that was allocated when the SYN segment was received.

Once the SYN/ACK segment reaches the partner apparatus, the ACK segment is transmitted from the partner apparatus. Once receiving this, the first protocol processing unit 11 searches the connection information, and finds the previously allocated connection information in which the connection state is "SYN_RECEIVED". If the condition of the connection establishment is met, the first protocol processing unit 11 performs a necessary update of the connection information, and then transits the connection state to "ESTABLISHED".

After this, by the instruction from the second protocol processing unit 21 and the like, both of the transmission and reception of data are processed in the first protocol processing unit 11, using the connection information and the register interface. In the case where the transmission and reception of all the data are completed, or in the case where an event to break the connection occurs halfway, the connection is broken by a segment in which the FIN flag or RST flag of the control flags in TCP is set to 1. In this case, the segment in TCP is passed as the control frame, from the first protocol processing unit 11 to the second protocol processing unit 21, and the second protocol processing unit 21 transits the connection state to "CLOSED".

When the connection state is transited to "CLOSED", this connection information is not used anymore, and therefore, the second protocol processing unit 21 requests the connection information managing unit 13 to free the storage area for storing this connection information. Thereby, this storage area is accumulated as the unused state in the queue, and is used when the connection allocation request is performed again. Here, in the embodiment, the above-described storage area freeing request is performed by the second protocol processing unit 21, but this may be performed by the first protocol processing unit 11.

Figure 9:
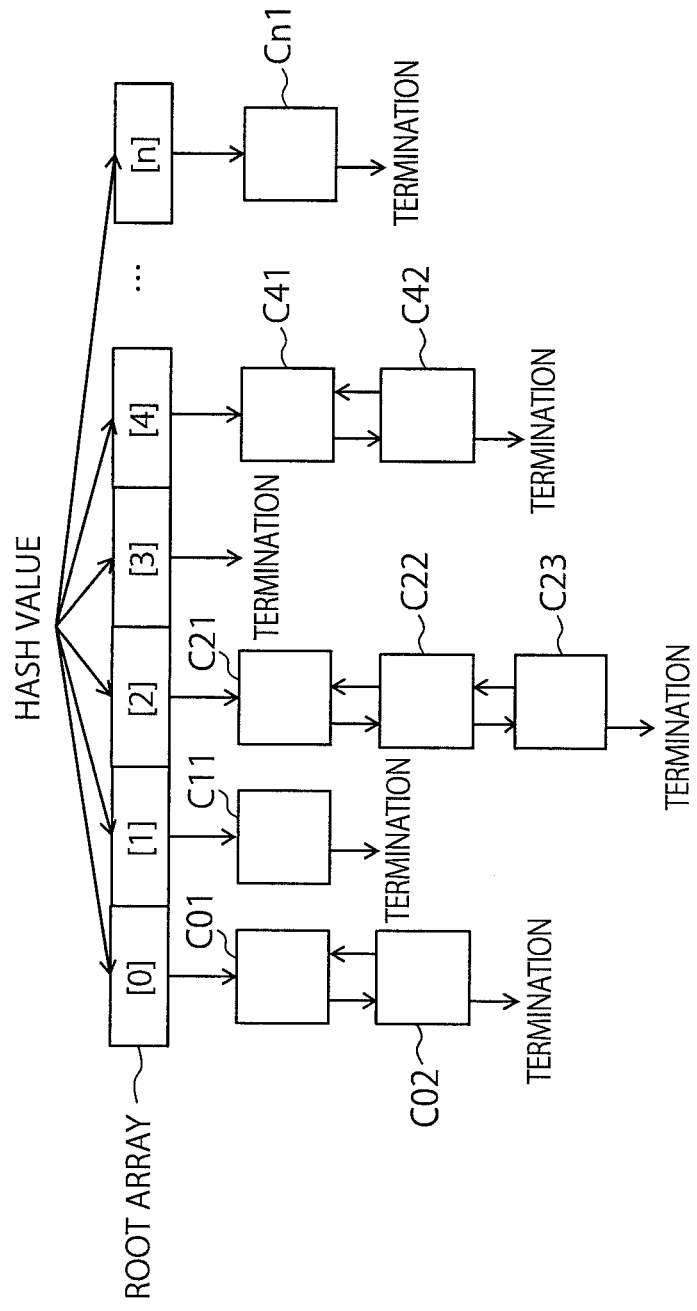
FIG. 9 is an example of the hash table according to the embodiment.

FIG. 9 is an example of the hash table according to the embodiment. In this hash table, which is shown as a conceptual diagram, pieces of connection information having the same hash value are associated. FIG. 9 shows a root array in which the indexes are hash values, and pieces of connection information C01, C02, C11, C21, C22, C23, C41, C42 and Cn1 ("n" is a positive integer) associated with the each element of the root array. In the root array, as many elements as the number of the hash values are prepared, and in each element of the root array, a pointer of the corresponding hash value is stored. In the example of FIG. 9, the start address of a storage area for storing the connection information C21 is stored in a root array [2].

In the search of the connection information, the first protocol processing unit 11 calculates the hash value for the connection information by a predetermined calculation formula. The predetermined calculation formula is, for example, the XOR between the IP address of the partner and the TCP port number of the partner that are obtained from the received frame. For example, the first protocol processing unit 11 searches the hash table using the calculated hash value, and thereby, finds the start address of the storage area for storing the connection information that is the search object.

For example, when the search object is the connection information C21, the first protocol processing unit 11 calculates the hash value as 2 from the received frame, and finds the start address of the storage area for storing the connection information C21 from the root array [2]. Then, the first protocol processing unit 11 reads out from the connection information storing unit 12, the information in an area of a predetermined length from the found start address, and thereby, can acquire the connection information C21 that is the search object.

Here, each connection information further has a pointer indicating the previous connection information (hereinafter, referred to as a previous pointer) "PREV", and a pointer indicating the next connection information (hereinafter, referred to as a next pointer) "NEXT". Thereby, it is possible to follow the connection information having the same hash value, from the root array. For example, the start address of the storage area for storing the connection information C22 is stored in the next pointer "NEXT" contained in the connection information C21, and therefore, it is possible to follow the connection information C22 from the connection information C21.

Further, the start address of the storage area for storing the connection information C21 is stored in the previous pointer "PREV" contained in the connection information C22, and the start address of the storage area for storing the connection information C23 is stored in the next pointer "NEXT" contained in the connection information C22. Therefore, it is possible to follow the connection information C23 from the connection information C22. Thus, the first protocol processing unit 11 follows the connection information having the same hash value, and checks the coincidence of the IP address and the port number between the received frame and the connection information, to search the connection.

As for the linking and deletion to the hash table, the first protocol processing unit 11 and the second protocol processing unit 21 perform the linking to the hash table, after allocating the storage area for storing the connection information, and the second protocol processing unit 21 performs the deletion from the hash table, before freeing the storage area for storing the connection information.

Concretely, when the connection is allocated, that is, when the connection information is valid, the first protocol processing unit 11 links the connection information to the hash table. Thereby, the first protocol processing unit 11 can judge whether or not the connection information as the object is valid, by whether or not it is being linked with the hash table.

Here, the hash table may be divided and used for each connection state. The area for the root array of the hash table may be provided in the connection information storing unit 12, or the information processor 100 may separately include a storing unit for the hash table.

The second protocol processing unit 21, for example, may instruct the first protocol processing unit 11 to write the "start address of the writing area of the reception data" to be allocated from now by the first protocol processing unit 11 in the next pointer "NEXT" of the previous connection information. Here, the previous connection information is the connection information that has the same hash value as the connection information to be allocated from now by the first protocol processing unit 11 and that is linked to the termination of the hash table in FIG. 9. Thereby, the first protocol processing unit 11 can follow the connection information to be allocated from now, from the previous connection information.

Further, for example, the second protocol processing unit 21 may instruct the first protocol processing unit 11 to write the "start address of the writing area of the reception data" of the above-described previous connection information, in the "PREV" of the connection information to be allocated from now by the first protocol processing unit 11. Thereby, the first protocol processing unit 11 can follow the previous connection information, from the connection information to be allocated from now.

(The Flow of the Active Open)

Figure 10:
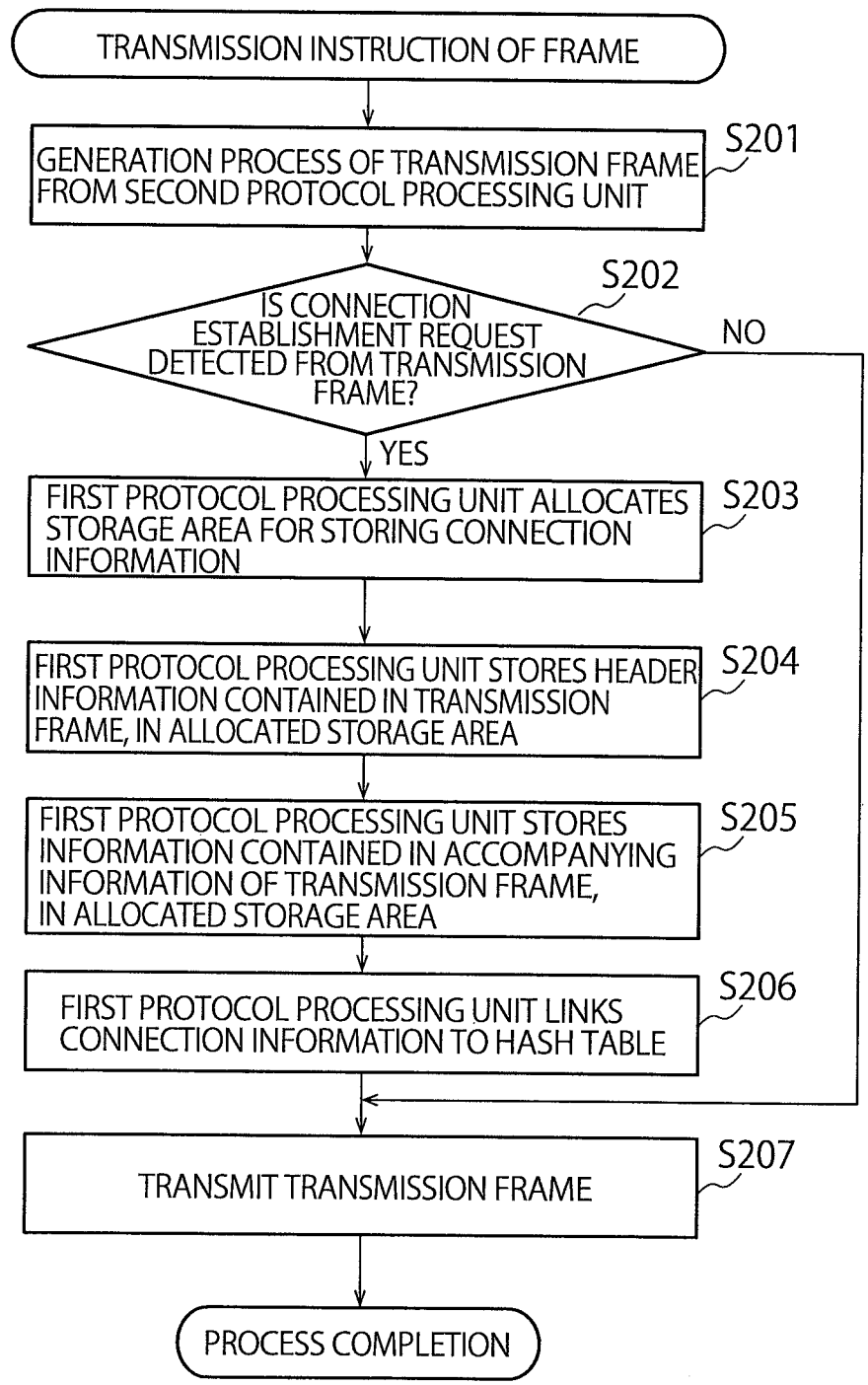
FIG. 10 is a flowchart showing an example of the flow of the process of the active open in the connection establishment according to the embodiment.

Next, the flow of the active open in the embodiment will be explained using a flowchart in FIG. 10. FIG. 10 is a flowchart showing an example of the flow of the process of the active open in the connection establishment according to the embodiment.

(Step S201) First, the second protocol processing unit 21 performs the output process of the transmission frame. For example, the second protocol processing unit 21 generates the SYN segment for performing the connection establishment. After generating the SYN segment, the second protocol processing unit 21 stores the address and length of the generated segment, in a descriptor of the transmission frame descriptor ring, as the reading source address of the frame and the length of the frame. On this occasion, the second protocol processing unit 21 adds, as the accompanying information of the frame, the address and length of the writing area of the reception data, and the address and length of the reading area of the transmission data. Here, the reason for adding this information is to make it possible to set these values in the connection information when the connection information is allocated later, since this information is the information that is not contained in the SYN segment.

Furthermore, for linking the connection information to the list of the hash table, the second protocol processing unit 21 acquires the addresses and values (connection-information linking information) of the previous connection information and next connection information to a position where the connection information to be allocated is inserted, and writes them in the descriptor. For example, the start address of the next connection information to the position where the connection information to be allocated is inserted, the address of the "pointer to the previous connection information (PREY)" of the next connection information to the position where the connection information to be allocated is inserted, and the address of the "pointer to the next connection information (NEXT)" of the previous connection information to the position where the connection information to be allocated is inserted are written.

On this occasion, if the connection information to be allocated is positioned at the tail end of the list, a special value that shows non-existence, such as "NULL", is written as the start address of the next connection information to the position where the connection information to be allocated is inserted. Further, if the connection information to be allocated is positioned at the head of the list, the address of the corresponding element of the root array is written as the address of the "pointer to the next connection information (NEXT)" of the previous connection information to the position where the connection information to be allocated is written.

On this occasion, the second protocol processing unit 21 may explicitly show that this frame is the connection establishment request as the accompanying information of the frame. In this case, from this information, the first protocol processing unit 11 may make the judgment of being the connection establishment request. Then, the second protocol processing unit 21 instructs the first protocol processing unit 11 to transmit this descriptor.

(Step S202) The first protocol processing unit 11 reads out the frame, detects that it is the SYN segment in TCP, by the analysis of the header, and thereby, judges whether or not the connection establishment request is detected from the transmission frame.

(Step S203) In the case where the connection establishment request is detected from the transmission frame in step S202, the first protocol processing unit 11 requests the connection information managing unit 13 to allocate the storage area for storing the connection information. In response to this request, in the case where the connection establishment request is detected from the transmission frame or the reception frame as the result of the analysis by the first protocol processing unit 11, the connection information managing unit 13 allocates, in the connection information storing unit 12, the storage area for storing the connection information that is used while being shared with the CPU 2. Concretely, for example, the connection information managing unit 13 determines the start address of the storage area in which this connection information is stored.

(Step S204) Next, the first protocol processing unit 11 stores, as a part of the connection information, the header information contained in the transmission frame, in the storage area allocated by the connection information managing unit 13. Concretely, for example, the first protocol processing unit 11 stores, in the allocated storage area, the information such as its own IP address, the partner's IP address, its own TCP port number, the partner's TCP port number, the transmission sequence number and its own window size, from the information contained in the SYN segment. On this occasion, as for the connection state also, the SYN segment is transmitted, and therefore, the connection state is set to "SYN_SENT". Here, the information such as the destination MAC address, TTL value and TOS value that are contained in the SYN segment may be written.

(Step S205) Further, the first protocol processing unit 11 stores, as a part of the connection information, the information contained in the accompanying information of the frame that is contained in the transmission frame descriptor ring, in the storage area allocated by the connection information managing unit 13. Concretely, for example, the first protocol processing unit 11 acquires the writing destination address and length of the reception data and the reading source address and length of the transmission data, from the above accompanying information, and stores the acquired information in the storage area allocated by the connection information managing unit 13, as a part of the connection information.

(Step S206) Furthermore, when the initialization of the connection information is completed, the first protocol processing unit 11 performs the linking of the allocated connection information to the hash table. The linking process to the list of the hash table is performed using the connection-information linking information acquired from the descriptor. First, the first protocol processing unit 11 writes the start address of the next connection information to the position where the connection information is inserted, in the "pointer to the next connection information" of the allocated connection information. Next, if being not a value such as "NULL" showing the non-existence of the next connection information to the position where the allocated connection information is inserted, the first protocol processing unit 11 writes the start address of the allocated connection information, in the "pointer to the previous connection information (PREV)" of the next connection information to the position where the allocated connection information is inserted. Next, the first protocol processing unit 11 writes the start address of the allocated connection information, in the "pointer to the next connection information (NEXT)" of the previous connection information to the position where the allocated connection information is inserted.

Here, in the case where the information for linking the connection information to the hash table is not contained in the accompanying information, the linking of the connection information may be executed by the first protocol processing unit 11. Concretely, for example, the first protocol processing unit 11 calculates the hash value from the transmission frame, and extracts the element of the root array in which the index is the calculated hash value. The element of the root array is the start address of the storage area in which a first connection information associated with the hash value is stored. Then, the first protocol processing unit 11 reads out the value of "NEXT", from the storage area at an address that is predetermined bits away from the start address. The value of "NEXT" is the start address of the storage area for storing a second connection information associated with the first connection information. The first protocol processing unit 11 repeats this process.

In the repetition of this process, in the case where the value of "NEXT" is not yet stored in the storage area at an address that is the predetermined bits away from the start address of the storage area for storing an "i-th" ("i" is a natural number) connection information, for example, in the case of being "NULL", the first protocol processing unit 11 stores, in this storage area, the start address of the storage area for storing the connection information in question. Thereby, the start address of the storage area for storing the connection information in question is set to the value of "NEXT" contained in the "i-th" ("i" is a natural number) connection information. Then, the first protocol processing unit 11 stores the start address of the storage area for storing the "i-th" ("i" is a natural number) connection information, in the storage area for storing the "PREV" of the connection information in question.

(Step S207) In the case where the process in step S206 is completed, or in the case where the connection establishment request is not detected from the transmission frame in step S202, the first protocol processing unit 11 transmits the transmission frame. For example, in the case of being transited from step S206, the first protocol processing unit 11 transmits the SYN segment to the partner apparatus through the network.

Here, for facilitating the linking to the hash table, the second protocol processing unit 21 may calculate the hash value of the SYN segment in advance, and may calculate the entry address of the termination of the hash table.

Once receiving the SYN/ACK segment as the response from the partner apparatus, the first protocol processing unit 11 performs the protocol process of each layer of the received SYN/ACK segment. Then, the first protocol processing unit 11 searches the connection information. As the result of the search, the connection information to which the allocation and the initialization were previously performed is found. In this connection information, the connection state is "SYN_SENT". For this, the first protocol processing unit 11 checks the sequence number, the acknowledgement number and the like, and if the condition of the connection establishment is met, transits the connection state from "SYN_SENT" to "ESTABLISHED".

Next, the first protocol processing unit 11 transmits the ACK segment to the partner apparatus. Then, the ACK segment is processed in the partner apparatus, the connection is established between both, so that the transmission and reception of data can be performed. The break of the connection is the same as the passive open, and therefore, is omitted.

(The Flow of the Simultaneous Open)

Finally, the flow of the simultaneous open according to the embodiment will be explained. The simultaneous open has the same sequence as the active open halfway. The generation and transmission of the SYN segment by the second protocol processing unit 21 are performed in the same procedure as the active open. Then, the processes vary after the reception of the SYN segment as the response.

Once receiving the SYN segment, the first protocol processing unit 11 performs the protocol process of each layer. The first protocol processing unit 11 makes the judgment of being the connection establishment request, from the result of the process, and performs the storage area allocation request for storing the connection information, to the connection information managing unit 13. Then, the first protocol processing unit 11 initializes the connection information, and thereafter, passes the SYN segment received together with the connection information, to the second protocol processing unit 21.

The second protocol processing unit 21 searches the connection information, and detects the simultaneous open. Two pieces of connection information: the connection information in which the connection state is "SYN_SENT" and the connection information in which the connection state is "SYN_RECEIVED" have been created, and therefore, for deleting the connection information in which the connection state is "SYN_SENT", the second protocol processing unit 21 performs the freeing request of the storage area for storing the connection information, to the connection information managing unit 13. On this occasion, instead of freeing the storage area for storing the connection information in which the connection state is "SYN_SENT", the connection information managing unit 13 may free the storage area for storing the connection information in which the connection state is "SYN_RECEIVED", and may transit the connection state from "SYN_SENT" to "SYN_RECEIVED".

The second protocol processing unit 21 generates a SYN/ACK segment for the connection in which the connection state is "SYN_RECEIVED", and instructs the first protocol processing unit 11 to transmit it. Since a SYN/ACK segment is similarly transmitted from the partner, the first protocol processing unit 11 performs the protocol process of each layer, and thereafter, searches the connection information. As the result of the search, the second protocol processing unit 21 finds the connection in which the connection state is "SYN_RECEIVED". Then, the second protocol processing unit 21 performs the connection establishment judgment. As the result of the establishment judgment, the connection state is set to "ESTABLISHMENT", and after this, it is possible to perform the transmission and reception of data.

Effect

Thus, according to the embodiment, the first protocol processing unit 11 analyzes the transmission frame that is generated by the external CPU and that is transmitted to the partner apparatus, or the reception frame that is received from the partner apparatus. When the connection establishment request is detected from the transmission frame or the reception frame as the result of the analysis by the first protocol processing unit 11, the connection information managing unit 13 allocates the storage area for storing the connection information that is used while being shared with the CPU 2, in the predetermined storing apparatus that can be accessed by the CPU 2. The first protocol processing unit 11 notifies the CPU 2 of the information indicating the storage area allocated by the connection information managing unit 13.

Thereby, the CPU 2 does not need to allocate the storage area for storing the connection information, and therefore, it is possible to lower the load on the CPU 2. Further, the first protocol processing unit 11 of the communication unit 1 allocates the storage area for storing the connection information, without going through the CPU 2, and therefore, it is possible to shorten the time for the allocation of the storage area for storing the connection information.

Further, the first protocol processing unit 11 allocates the storage area for storing the connection information, in the connection information storing unit 12 of the communication unit 1. Thereby, it is unnecessary to perform the communication between the CPU 2 and the communication unit 1 in order to allocate the storage area for storing the connection information, and therefore, it is possible to reduce the utilization rate of the bus bandwidth between the CPU 2 and the communication unit 1. Therewith, it is possible to shorten the time necessary for the allocation of the storage area for storing the connection information.

Particularly, in the case where the information processor 100 establishes many connections and distributes data at a broad bandwidth, it is possible to lower the load on the CPU 2 and the utilization rate of the bus bandwidth, and to actualize a quick connection establishment and data transmission and reception.

Further, the first protocol processing unit 11 of the communication unit 1 initializes the connection information from the information contained in the reception frame or the transmission frame, and thereby, it is possible to shorten the time for the initialization of the connection information.

Further, the connection information managing unit 13 manages the unused connection information in the queue, and thereby, it is possible to immediately allocate the unused connection information without the search.

Here, in the above-described embodiment, the example in which the connection information is searched using the hash table has been shown. However, it is allowable to provide a bit indicating whether to be used or unused, in the connection information itself, and to search all the connection information while checking this bit, or it is allowable to perform the search using a bit map area for previously managing whether to be used or unused.

Further, the above-described embodiment adopts TCP as an example. However, another protocol for performing the data communication after the connection establishment, such as SCTP (Stream Control Transmission Protocol), can be also used. In SCTP, an INIT packet or a COOKIE-ECHO packet may be regarded as the connection establishment request, in the operation. The offload engine of the communication unit 1 may be actualized by hardware such as an ASIC (Application Specific Integrated Circuit), or may be actualized by a network processor, a DSP (Digital Signal Processor), a GPU (Graphics Processing Unit), another general-purpose processor or the like.

Further, the above-described embodiment has shown an example in which the connection information storing unit 12 is included in the communication unit 1, but the connection information storing unit 12 may be included in the memory 3. In this case, it is possible to lower the load on the CPU, although there is no effect of the reduction in the utilization rate of the bus bandwidth.

Here, the communication unit 1 can be actualized, for example, when a processor built in a computer apparatus (for example, a PCI card) executes a program. On this occasion, it is allowable to actualize the communication unit 1 by previously installing the above program in the computer apparatus. Further, it is allowable to actualize it by storing the above program in a storage medium such as a CD-ROM or distributing it through a network, and then appropriately installing this program in the computer apparatus. Further, the first protocol processing unit 11 can be actualized by appropriately utilizing a storage medium or the like such as a memory, hard disk, CD-R, CD-RW, DVD-RAM or DVD-R that is embedded in or externally attached to the above computer apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication apparatus for communicating with a partner apparatus through a network, the communication apparatus comprising:
a hardware circuit configured to:
analyze a transmission frame or a reception frame, the transmission frame being generated by an external CPU and being transmitted to the partner apparatus, the reception frame being received from the partner apparatus;
manage multiple unused-state storage areas in which connection information is stored, in a predetermined storing apparatus accessible by the CPU, and manage storage area discrimination information by which each of the unused-state storage areas is discriminated;
determine the unused-state storage area in which connection information is stored, from the multiple unused-state storage areas, when a connection establishment request is detected from the transmission frame or the reception frame as a result of the analyzing, the connection information being used while being shared with the CPU; and
notify the CPU of the storage area discrimination information by which the determined unused-state storage area is discriminated.

2. The communication apparatus according to claim 1, wherein the storage area discrimination information is a start address of the storage area in which the connection information is stored.

3. The communication apparatus according to claim 1, wherein the hardware circuit is configured to control storing, when the connection establishment request is detected from the transmission frame or the reception frame as a result of the analyzing, as a part of the connection information, header information contained in the transmission frame or the reception frame, in the determined unused-state storage area.

4. The communication apparatus according to claim 1, wherein the hardware circuit is configured to control storing, when the connection establishment request is detected from the transmission frame as a result of the analyzing, store, as a part of the connection information, information indicating an area of a writing destination of reception data and information indicating an area of a reading source of transmission data that are acquired from the CPU together with the transmission frame, in the determined unused-state storage area.

5. An information processor comprising:
a CPU configured to execute a predetermined protocol process; and
a communication apparatus which communicates with a partner apparatus through a network,
wherein the communication apparatus comprises a hardware circuit configured to:
analyze a transmission frame or a reception frame, the transmission frame being generated by the CPU and being transmitted to the partner apparatus, the reception frame being received from the partner apparatus;
manage multiple unused-state storage areas in which connection information is stored, in a predetermined storing apparatus accessible by the CPU, and manage storage area discrimination information by which each of the unused-state storage areas is discriminated;
determine the unused-state storage area in which connection information is stored, from the multiple unused-state storage areas, when a connection establishment request is detected from the transmission frame or the reception frame as a result of the analyzing, the connection information being used while being shared with the CPU; and
notify the CPU of the storage area discrimination information by which the determined unused-state storage area is discriminated.

6. The information processor according to claim 5, wherein the CPU is configured to judge whether or not to accept the connection establishment request detected from the reception frame, and when a judgment of non-acceptance of the connection establishment request is made, request the circuitry to free a storage area determined for the connection establishment request, and
the hardware circuit is configured to free the storage area, in response to the request from the CPU.

7. A communication method to be executed by a communication apparatus for communicating with a partner apparatus through a network,
analyzing a transmission frame or a reception frame, the transmission frame being generated by an external CPU and being transmitted to the partner apparatus, the reception frame being received from the partner apparatus;

managing multiple unused-state storage areas in which connection information is stored, in a predetermined storing apparatus accessible by the CPU, and managing storage area discrimination information by which each of the unused-state storage areas is discriminated;

determining the used-state storage area in which the connection information is stored, from the multiple unused-state storage areas, when a connection establishment request is detected from the transmission frame or the reception frame, the connection information being used while being shared with the CPU; and notifying the CPU of the storage area discrimination information by which the determined unused-state storage area is discriminated.

8. A non-transitory computer-readable storage medium having a communication program recorded therein, the communication program, when executed, causing a hardware processor of a communication apparatus which communicates with a partner apparatus through a network, to execute:

analyzing a transmission frame or a reception frame, the transmission frame being generated by an external CPU and being transmitted to the partner apparatus, the reception frame being received from the partner apparatus;

managing multiple unused-state storage areas in which connection information is stored, in a predetermined storing apparatus accessible by the CPU, and managing storage area discrimination information by which each of the unused-state storage areas is discriminated;

determining the unused-state storage area in which the connection information is stored, from the multiple unused-state storage areas, when a connection establishment request is detected from the transmission frame or the reception frame as a result of the analyzing, the connection information being used while being shared with the CPU; and notifying the CPU of the storage area discrimination information by which the determined unused-state storage area is discriminated.

* * * * *